UNITED STATES PATENT OFFICE.

JOSEPH VAN RUYMBEKE, OF AURORA, ILLINOIS, ASSIGNOR OF ONE-HALF TO WILLIAM F. JOBBINS, OF SAME PLACE.

PROCESS OF PURIFYING CANDLE CRUDE GLYCERIN.

SPECIFICATION forming part of Letters Patent No. 558,441, dated April 14, 1896.

Application filed March 29, 1895. Serial No. 543,732. (No specimens.)

*To all whom it may concern:*

Be it known that I, JOSEPH VAN RUYMBEKE, a subject of the King of Belgium, residing at Aurora, Kane county, in the State of Illinois, have invented certain new and useful Improvements in the Process of Purifying Candle Crude Glycerin; and I do hereby declare the following to be a full, clear, and exact description of the invention, which will enable others skilled in the art to which it appertains to make and use the same.

My invention relates to an improved process of purifying candle crude glycerin.

When fats are decomposed to produce fatty acids and glycerin, the former are usually separated from the glycerin-water upon which they are floating, by decantation. The glycerin-water, however, as it comes from the digesters, where the decomposition has been effected, is not a clear solution, but is an emulsion of fatty acids and aqueous solution of glycerin, in which emulsion the suspended and emulsified fatty acids often amount to twice as much as the glycerin. To separate the fatty acids from the emulsion, it is generally customary to evaporate the liquid in open vats, and to collect the fatty acids from the top of the liquid by skimming as the separation is effected by the concentration, but this separation is imperfect, as it still leaves more or less fatty acids in the crude glycerin as now produced. Such a process of the evaporation of the emulsion is expensive and obnoxious, because the odor developed thereby is very disagreeable and penetrating, besides which an inferior glycerin is obtained because some of the fatty acids dissolve in the concentrated glycerin.

My invention has in view to dispense with this obnoxious and injurious step of concentration. With this object in view, I break up the emulsion previous to concentration, and effect this result by the addition of a small amount of a strong water-soluble acid. One-tenth of one per cent. or less of volume of 66° Baumé sulfuric acid will be sufficient. This is added to the glycerin-water while hot, which is then allowed to stand until cool enough for the fatty acids to form in a solid layer upon the top, leaving a perfectly transparent liquid containing the glycerin below. For this separation twelve hours will generally be found to be sufficient. Under some circumstances, and in warm climates, the acidulated glycerin-water may be cooled by artificial means, such as by ordinary cooling pipes within the tank, and through which cold water may be circulated. The fatty acids are then removed, or the glycerin-water is drawn off. To the glycerin-water, which is now slightly acid, slaked lime is added in sufficient quantity to neutralize, or preferably a little more than neutralize the acid. The thorough admixture of the lime is secured by any usual means, such as by blowing air through the liquid. The neutralized liquid is then filtered or clarified by settling and decantation. The resulting liquid will be clear and ready for evaporation in any approved form of evaporating apparatus.

A better result may be secured by the addition of animal-black, or other similar decolorizing agent, with the lime, when, after filter-pressing, a perfectly white glycerin is obtained which will need no further treatment in order to yield by distillation an unusually pure glycerin.

Having now described my invention, what I desire to secure by Letters Patent is as follows:

1. In the art of separating emulsified fatty acids, from glycerin-waters, the improvement which consists in adding to such waters a small portion of a water-soluble acid, then in allowing the mixture to cool until the mixture separates into a layer of fatty acids and a subjacent clear aqueous glycerin solution, then in separating the fatty acids from the glycerin solution, and finally in neutralizing the acid, as and for the purpose set forth.

2. In the art of separating emulsified fatty acids from glycerin-waters, the improvement which consists in adding to such waters a small portion of a water-soluble acid, then in allowing the mixture to cool until the mixture separates into a layer of fatty acids and a subjacent clear aqueous glycerin solution, then in separating the fatty acids from the glycerin solution, and finally in adding to the glycerin solution lime in quantity sufficient to slightly more than neutralize the acid, as and for the purpose set forth.

3. In the art of separating emulsified fatty acids from glycerin-waters, the improvement which consists in adding to such waters a small portion of a water-soluble acid, then in allowing the mixture to cool until the mixture separates into a layer of fatty acids and a subjacent clear aqueous glycerin solution, then in separating the fatty acids from the glycerin solution, and in finally adding to the glycerin solution lime in quantity sufficient to slightly more than neutralize the acid therein, together with a decolorizing agent, as and for the purpose set forth.

4. In the art of separating emulsified fatty acids from glycerin-waters, the improvement which consists in adding to such waters a small portion of a water-soluble acid, then in allowing the mixture to cool until the mixture separates into a layer of fatty acids and a subjacent clear aqueous glycerin solution, then in separating the fatty acids from the glycerin solution, then in adding to the glycerin solution lime in quantity sufficient to slightly more than neutralize the acid therein, and finally in filtering the liquid, as and for the purpose set forth.

5. In the art of separating emulsified fatty acids from glycerin-waters, the improvement which consists in adding to such waters a small portion of a water-soluble acid, then in allowing the mixture to cool until the mixture separates into a layer of fatty acids and a subjacent clear aqueous glycerin solution, then in separating the fatty acids from the glycerin solution, then in adding to the solution lime in quantity sufficient to slightly more than neutralize the acid therein, then in filtering the liquid, and finally in concentrating the liquid, as and for the purpose set forth.

6. In the art of separating emulsified fatty acids from glycerin-waters, the improvement which consists in adding to such waters a small portion of a water-soluble acid, then in allowing the mixture to cool until the mixture separates into a layer of fatty acids and a subjacent clear aqueous glycerin solution, then in separating the fatty acids from the glycerin solution, then in adding to the solution lime in quantity sufficient to slightly more than neutralize the acid therein, then in filtering the liquid, then in concentrating the liquid, and finally in distilling the glycerin from the liquid, as and for the purpose set forth.

This specification signed and witnessed the 15th day of March, 1895.

JOSEPH VAN RUYMBEKE.

Witnesses:
A. S. LUDLOW,
THOS. M. STARKE.